US010651446B2

(12) United States Patent
Tanabe et al.

(10) Patent No.: US 10,651,446 B2
(45) Date of Patent: May 12, 2020

(54) BATTERY AND MANUFACTURING METHOD OF THE SAME

(71) Applicant: Toyota Jidosha Kabushiki Kaisha, Toyota-shi, Aichi-ken (JP)

(72) Inventors: Yukinari Tanabe, Nagoya (JP); Keiji Kaita, Miyoshi (JP); Nobuyuki Yamazaki, Okazaki (JP); Masaru Takagi, Toyota (JP); Teruo Ishishita, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 117 days.

(21) Appl. No.: 15/984,784

(22) Filed: May 21, 2018

(65) Prior Publication Data

US 2018/0337383 A1  Nov. 22, 2018

(30) Foreign Application Priority Data

May 22, 2017 (JP) .................. 2017-100970

(51) Int. Cl.
| | | |
|---|---|---|
| H01M 4/02 | (2006.01) | |
| H01M 2/16 | (2006.01) | |
| H01M 2/26 | (2006.01) | |
| H01M 10/04 | (2006.01) | |
| H01M 4/133 | (2010.01) | |

(Continued)

(52) U.S. Cl.
CPC ......... *H01M 2/1673* (2013.01); *H01M 2/263* (2013.01); *H01M 4/133* (2013.01); *H01M 4/364* (2013.01); *H01M 4/625* (2013.01); *H01M 4/64* (2013.01); *H01M 4/75* (2013.01); *H01M 10/04* (2013.01); *H01M 10/0431* (2013.01); *H01M 10/0587* (2013.01); *H01M 10/42* (2013.01); *H01M 2/022* (2013.01); *H01M 4/13* (2013.01); *H01M 10/0525* (2013.01)

(58) Field of Classification Search
CPC ....................................................... H01M 4/02
See application file for complete search history.

(56) References Cited

U.S. PATENT DOCUMENTS

| | | | |
|---|---|---|---|
| 2005/0031949 A1 | 2/2005 | Maeda | |
| 2009/0297929 A1 | 12/2009 | Uchida | |
| 2012/0196172 A1* | 8/2012 | Maeda | ............... H01M 2/1673 429/139 |

FOREIGN PATENT DOCUMENTS

| | | |
|---|---|---|
| EP | 2139057 A1 | 12/2009 |
| JP | H11135110 A | 5/1999 |

(Continued)

*Primary Examiner* — Jacob B Marks
(74) *Attorney, Agent, or Firm* — Dinsmore & Shohl LLP (57) ABSTRACT

A battery includes at least an electrode group including a positive electrode, a separator, a negative electrode, and a protection layer. The separator is interposed between the positive electrode and the negative electrode. The positive electrode includes a positive electrode current collector, a positive electrode mixture layer, and a positive electrode tab. The positive electrode mixture layer is disposed on a surface of the positive electrode current collector. The positive electrode tab is electrically connected to the positive electrode current collector. The protection layer covers a surface of the positive electrode tab. A volume resistivity of the protection layer is within a range of one to 100 times a volume resistivity of the positive electrode mixture layer.

10 Claims, 4 Drawing Sheets

(51) Int. Cl.
      *H01M 4/36*       (2006.01)
      *H01M 4/62*       (2006.01)
      *H01M 10/0587*   (2010.01)
      *H01M 4/75*       (2006.01)
      *H01M 10/42*     (2006.01)
      *H01M 4/64*       (2006.01)
      H01M 2/02       (2006.01)
      H01M 10/0525   (2010.01)
      H01M 4/13       (2010.01)

(56) References Cited

FOREIGN PATENT DOCUMENTS

| | | |
|---|---|---|
| JP | 2005-056676 A | 3/2005 |
| JP | 2009-048971 A | 3/2009 |
| JP | 2009-289570 A | 12/2009 |
| JP | 2012-178326 A | 9/2012 |

* cited by examiner

BATTERY AND MANUFACTURING METHOD OF THE SAME

CROSS REFERENCE TO RELATED APPLICATIONS

This application claims priority to Japanese Patent Application No. 2017-100970 filed on May 22, 2017, which is incorporated herein by reference in its entirety including the specification, drawings and abstract.

BACKGROUND

1. Technical Field

The present disclosure relates to a battery and a manufacturing method the same.

2. Description of Related Art

Japanese Patent Application Publication No. 2009-048971 discloses a method of a withstand voltage test on an electrode group. In the withstand voltage test, a voltage is applied across a positive electrode and a negative electrode to test whether a leakage current flows between the positive electrode and the negative electrode.

SUMMARY

Foreign objects (e.g., weld spatter, cutting residue, etc.) can get trapped in an electrode group. Such foreign objects can cause minor short-circuit. One method to test for trapped foreign objects is a withstand voltage test. The withstand voltage test is conducted on an electrode group before it is impregnated with an electrolytic solution. In the withstand voltage test, a predetermined voltage is applied across the positive electrode and the negative electrode to test whether a leakage current flows therebetween. If a leakage current flows, some foreign object may be trapped.

To introduce and derive a current into and from the battery, a positive electrode tab is joined to the positive electrode. The positive electrode tab is, for example, an aluminum (Al) strip. The positive electrode tab is covered with a protection tape in order to avoid internal short-circuit due to edges of the positive electrode tab etc. This protection tape has high insulation resistance. Therefore, when a foreign object is trapped between the protection tape and the negative electrode, the withstand voltage test may fail to detect the foreign object as no leakage current flows through the protection tape.

The present disclosure provides a battery that allows a foreign object trapped between the protection tape of the positive electrode tab and the negative electrode to be detected in a withstand voltage test.

In the following, the technical configuration and the workings and effects of the present disclosure will be described. The working mechanism of the present disclosure includes presumption. Therefore, the scope of claims should not be limited depending on whether this working mechanism is valid.

A first aspect of the present disclosure relates to a battery. The battery includes at least an electrode group. The electrode group includes a positive electrode, a separator, a negative electrode, and a protection layer. The separator is interposed between the positive electrode and the negative electrode. The positive electrode includes a positive electrode current collector, a positive electrode mixture layer, and a positive electrode tab. The positive electrode mixture layer is disposed on a surface of the positive electrode current collector The positive electrode tab is electrically connected to the positive electrode current collector. The protection layer covers a surface of the positive electrode tab. A volume resistivity of the protection layer is within a range of one to 100 times a volume resistivity of the positive electrode mixture layer.

In a conventional battery, the protection tape has a volume resistivity of, for example, approximately $10^{16}$ times the volume resistivity of the positive electrode mixture layer. In the battery of the present disclosure, by contrast, a volume resistivity of the protection layer is within a range of one to 100 times the volume resistivity of the positive electrode mixture layer. Therefore, a leakage current can flow also through the protection layer in a withstand voltage test. This means that a foreign object trapped between the protection layer and the negative electrode cap be detected. When the volume resistivity of the protection layer exceeds 100 times the volume resistivity of the positive electrode mixture layer, it can become difficult to detect a foreign object between the protection layer and the negative electrode. On the other hand, when the volume resistivity of the protection layer is lower than the volume resistivity of the positive electrode mixture layer, a current tends to concentrate on the protection layer This can make it difficult to avoid internal short-circuit due to edges of the positive electrode tab etc.

In the first aspect, the protection layer may include an electrical insulating material and carbon particles. The volume resistivity of this protection layer can be adjusted through the adjustment of the content of the carbon particles.

In the first aspect, the carbon particles may include at least one of carbon black, graphite, vapor-grown carbon fiber, and graphene flake.

In the first aspect, the protection layer may include an electrical insulating material and metal particles.

The metal particles may include aluminum particles.

The protection layer may be interposed between the positive electrode tab and the separator.

A second aspect of the present disclosure relates to a battery. The battery includes at least an electrode group. The electrode group includes a positive electrode, a separator, a negative electrode, and a protection layer. The separator is interposed between the positive electrode and the negative electrode. The positive electrode includes a positive, electrode current collector, a positive electrode mixture layer, and a positive electrode tab. The positive electrode mixture layer is disposed on a surface of the positive electrode current collector. The positive electrode tab is electrically connected to the positive electrode current collector. The protection layer covers it surface of the positive electrode tab. The protection layer includes an insulation layer and a vapor-deposited metal laver. The insulation layer includes an electrical insulating material. The vapor-deposited metal layer is interposed between the insulation layer and the separator. The vapor-deposited metal layer is in contact with at least a part of the positive electrode mixture layer.

In this battery, the positive electrode tab can be protected by the insulation layer. Moreover, a leakage current can flow from the vapor-deposited metal layer to the positive electrode mixture layer, such that a foreign object trapped between the protection layer and the negative electrode can be detected.

In the second aspect, the electrical insulating material may include at least one of polyimide fiber, ceramic, polyethylene, polypropylene, and polytetrafluoroethylene.

In the second aspect, the electrical insulating material may be polyimide, Polyimide has a high volume resistivity as well as excellent mechanical strength, heat resistance, etc.

A third aspect of the present disclosure relates to a battery manufacturing method. The battery manufacturing method includes the following steps (α), (β), and (γ): (α) Manufacturing an electrode group. (β) Conducting a withstand voltage test on an electrode group. (γ) Manufacturing a battery including an electrode group that has been determined to be a non-defective product in the withstand voltage test. The electrode group includes a positive electrode, a separator, a negative electrode, and a protection layer. The separator is interposed between the positive electrode and the negative electrode. The positive electrode includes a positive electrode current collector, a positive electrode mixture layer, and a positive electrode tab. The positive electrode mixture layer is disposed on a surface of the positive electrode current collector. The positive electrode tab is electrically connected to the positive electrode current collector. The protection layer covers a surface of the positive electrode tab. In the withstand voltage test, voltage lower than an insulation breakdown voltage of the separator is applied across the positive electrode and the negative electrode, under a condition that a leakage current flows through the protection layer when a foreign object is present between the protection layer and the negative electrode, and the electrode group is determined to be a defective product when the leakage current flows between the positive electrode and the negative electrode, and the electrode group is determined to be a non-defective product when the leakage current does not flow between the positive electrode and the negative electrode.

This manufacturing method involves testing whether a foreign object is present between the protection layer and the negative electrode, so that a highly reliable battery can be manufactured.

In the third aspect, a volume resistivity of the protection layer may be within a range of one to 100 times a volume resistivity of the positive electrode mixture layer. When the protection layer has a moderately low volume resistivity, the condition that a leakage current flows through the protection layer can be established.

In the third aspect, the protection layer may include an insulation layer and a vapor-deposited metal layer. The insulation layer may include an electrical insulating material. The vapor-deposited metal layer may be interposed between the insulation layer and the separator. The vapor-deposited metal layer may be in contact with at least a part of the positive electrode mixture layer. This protection layer allows a leakage current to flow from the vapor-deposited metal layer to the positive electrode mixture layer.

In the third aspect, the electrode group may be pressed in the withstand voltage test such that the separator elastically undergoes compressive deformation in a thickness direction of the separator. When the distance between the positive electrode and the negative electrode is thus reduced, the condition that a leakage current flows through the protection layer can be established.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An embodiment of the present disclosure (hereinafter also written as the "present embodiment") will be described below. However, the following description is not intended to limit the scope of claims. For example, while a lithium-ion secondary battery will be described below, the battery of the present embodiment should not be limited to a lithium-ion secondary battery. The battery of the present embodiment can also be, for example, a lithium primary battery, a sodium ion secondary battery or a nickel-hydrogen secondary battery.

For the convenience of description, the dimensional relationships in the drawings of the present disclosure are changed as appropriate. Thus, the dimensional relationships shown in the drawings of the present disclosure do not represent the actual dimensional relationships.

<Battery>

Figure 1:
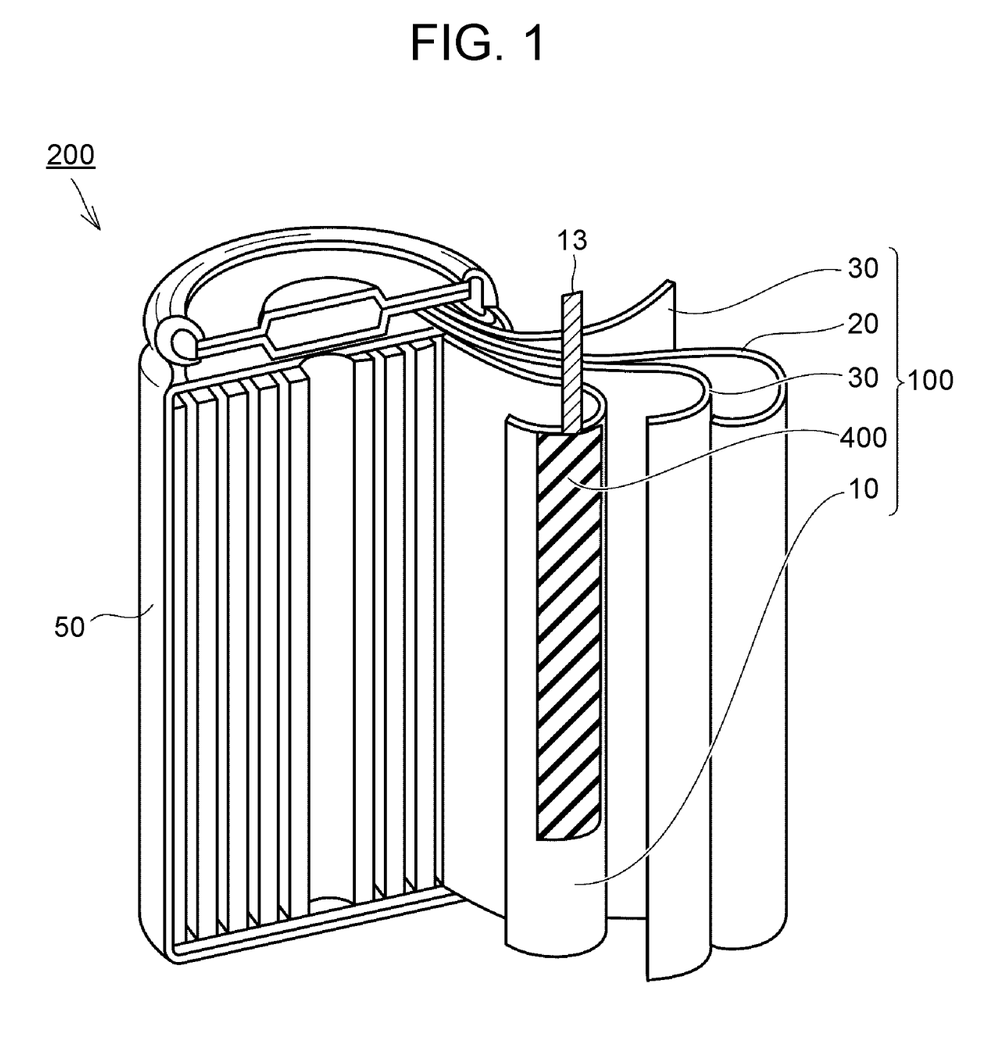
FIG. 1 is a schematic view showing an example of the configuration of a battery according to an embodiment of the present disclosure.

FIG. 1 is a schematic view showing an example of the configuration of a battery according to an embodiment of the present disclosure. A battery 200 includes a casing 50. The casing 50 has a cylindrical shape. However, the easing of the present embodiment should not be limited to a cylindrical casing. For example, the casing of the present embodiment may have a rectangular shape (flat rectangular parallelepiped shape). The casing 50 is made of, for example, a metal material. For example, the casing 50 can be made of iron (Fe), stainless steel (SUS), aluminum (Al), or Al alloy. Provided that the casing 50 has a predetermined sealing property, the casing 50 may be made of, for example, a composite material of a metal material and a resin material. For example, the casing may be made of an aluminum laminate film. The casing 50 may include a current interruption device (CID), a gas exhaust valve, a liquid inlet, etc.

The casing 50 houses an electrode group 100 and an electrolytic solution (not shown). Thus, the battery 200 includes at least the electrode group 100. The electrode group 100 includes a positive electrode 10, a separator 30, a negative electrode 20, and a protection tape 400 (protection layer). The electrode group 100 is a rolled electrode group. Specifically, the electrode group 100 is composed of positive electrode 10, the separator 30, the negative electrode 20, and the separator 30 that are stacked in this order and then rolled into a spiral shape. Alternatively the electrode group of the present embodiment may be a stacked electrode group. A stacked electrode group can be formed by alternately stacking a positive electrode and a negative electrode with a separator inserted therebetween.

Figure 2:
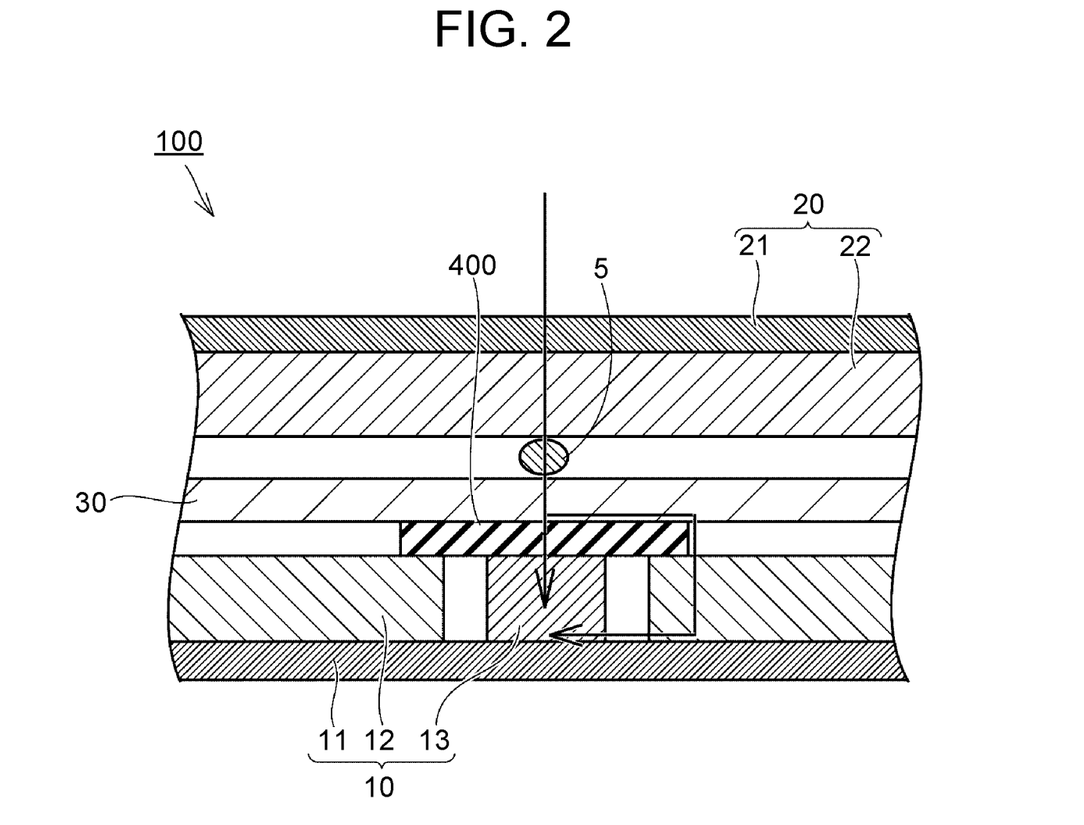
FIG. 2 is a conceptual sectional view showing an example of the configuration of an electrode group.

FIG. 2 is a conceptual sectional view showing an example of the configuration of the electrode group. The separator 30 is interposed between the positive electrode 10 and the negative electrode 20. The positive electrode 10 includes a positive electrode current collector 11, a positive electrode mixture layer 12, and a positive electrode tab 13. The positive electrode mixture layer 12 is disposed on a surface of the positive electrode current collector 11. The positive electrode tab 13 is electrically connected to the positive electrode current collector 11. The positive electrode tab 13 is joined to the positive electrode current collector 11, for example, by an ultrasonic welding process.

For example, the positive electrode tab 13 can be an Al strip. The positive electrode tab 13 may have a thickness of, for example, from 10 μm to 1 mm. In the present specification, the thickness of each component can be measured with a micrometer, for example. Alternatively, the thickness of each component may be measured in a microscopic cross-sectional image, for example.

The protection tape 400 covers a surface of the positive electrode tab 13. It is desirable that the protection tape 400 cover the entire surface of the positive electrode tab 13. The protection tape 400 may extend so as to cover a part of the positive electrode mixture layer 12.

The electrode group 100 is configured such that, when a foreign object 5 is present between the protection tape 400 and the negative electrode 20, applying a voltage, lower than an insulation breakdown voltage of the separator 30, across the positive electrode 10 and the negative electrode 20 causes a leakage current to flow from the protection tape 400 to the positive electrode tab 13. Thus, the foreign object 5 present between the protection tape 400 and the negative electrode 20 can be detected in a withstand voltage test.

The solid arrows in FIG. 2 indicate flows of a leakage current in a withstand voltage test. The leakage current may flow through the protection tape 400 and then flow into the positive electrode tab 13. The leakage current may flow from the protection tape 400 to the positive electrode mixture layer 12, and may further flow through the positive electrode current collector 11 into the positive electrode tab 13.

<Protection Tape>

First Example

The protection tape of the present embodiment may have a moderately low volume resistivity. Specifically, a volume resistivity of the protection tape 400 may be within a range of one to 100 times that volume resistivity. When the volume resistivity of the protection tape 400 exceeds 100 times the volume resistivity of the positive electrode mixture layer 12, it can become difficult to detect the foreign object 5 between the protection tape 400 and the negative electrode 20. On the other hand, when the volume resistivity of the protection tape 400 is lower than the volume resistivity of the positive electrode mixture lave 12, a current tends to concentrate on the protection tape 400. This can make it difficult to avoid internal short-circuit at edges of the positive electrode tab 13 etc.

The volume resistivity of the protection tape 400 may be not higher than 50 times, not higher than 20 times, not higher than 10 times, not higher than 5 times, or not higher than twice the volume resistivity of the positive electrode mixture layer 12. It is considered that the closer the volume resistivity of the protection tape 400 and the volume resistivity of the positive electrode mixture layer 12 are to each other, the more likely both the foreign object 5 present between the protection tape 400 and the negative electrode 20 and a foreign object present between the positive electrode mixture layer 12 and the negative electrode 20 are to be detected.

The volume resistivity of the protection tape 400 can be measured by a method in accordance with JISC2151: Testing Methods of Plastic Films for Electrical Purposes. The volume resistivity of the protection tape 400 is measured at least three times. An arithmetic mean value of at least three measurements is used as a measurement result. The protection tape 400 can have a volume resistivity of, for example, not lower than 1 Ω·cm nor higher than 10000 Ω·cm, or typically not lower than 10 Ω·cm nor higher than 1000 Ω·cm.

The volume resistivity of the positive electrode mixture layer 12 can be measured by a method in accordance with JISK7194: Testing Method for Resistivity of Conductive Plastics with a Four-point Probe Array. As a measurement device, for example, the resistivity meter "Loresta" series by Mitsubishi Chemical Analytech or equivalents can be used. The volume resistivity of the positive electrode mixture layer 12 is measured at least at 10 points. An arithmetic mean value of measurements taken at least at 10 points is used as a measurement result. The positive electrode mixture layer 12 may have a volume resistivity of, for example, not lower than 1 Ω·cm nor higher than 100 Ω·cm, or typically not lower than 5 Ω·cm nor higher than 15 Ω·cm.

The size of the protection tape 400 may be just large enough to cover the positive electrode tab 13. The planar shape of the protection tape 400 can be, for example, a rectangular shape. The protection tape 400 may have a thickness of, for example, not smaller than 1 μm nor larger than 1 mm.

Figure 3:
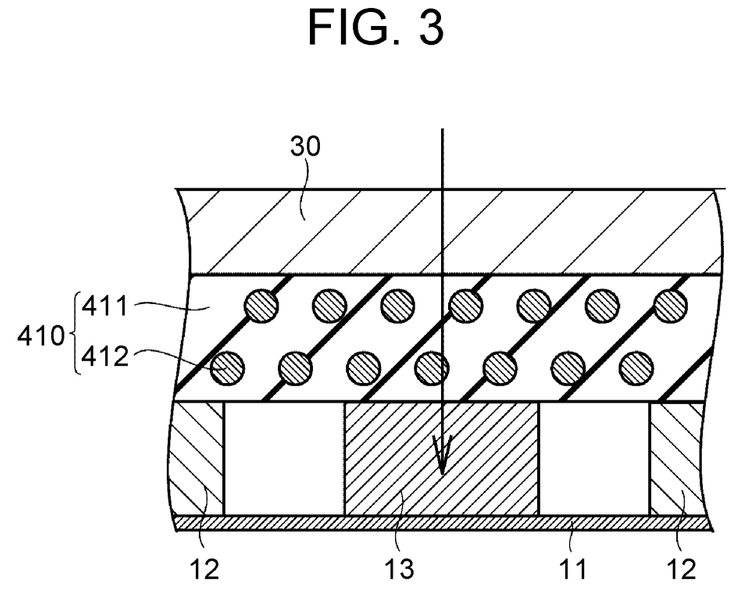
FIG. 3 is a conceptual sectional view showing an example of a protection layer.

The volume resistivity of the protection tape 400 may be adjusted, for example, by including an electrically conductive substance in the protection tape 400. FIG. 3 is a conceptual sectional view showing an example of the protection tape. A protection tape 410 (protection layer) includes an electrical insulating material 411 and carbon particles 412. The volume resistivity of the protection tape 410 can be adjusted through the adjustment of the content of the carbon particles 412. The electrical insulating material 411 may be, for example, polyimide. Polyimide has a high volume resistivity as well as excellent mechanical strength, heat resistance, etc. The electrical insulating material 411 may be, for example, glass fiber, ceramic, polyethylene (PE), polypropylene (PP), or polytetrafluoroethylene (PTFE). One type of electrical insulating material may he used alone, or two or more types of electrical insulating material may be used in combination.

The carbon particles 412 can be, for example, carbon black, graphite, vapor-grown carbon fiber, or graphene flake. One type of carbon particles may be used alone, or two or more types of carbon particles may be used in combination.

Instead of the carbon particles 412, metal particles may be used. The metal particles can be, for example, Al particles. The carbon particles 412 and the metal particles may have an average particle size of, for example, from 0.1 μm to 10 μm. The average particle size is represented by a particle size at 50% from a small particle side in a volume-based cumulative particle size distribution that is measured by a laser diffraction scattering method.

The protection tape 410 may include other materials in addition to the aforementioned material. For example, the protection tape 410 can further include an adhesive material. The adhesive material can be, for example, an acrylic adhesive material. The protection tape 410 may be, for example, a non-woven fabric base material impregnated with the carbon particles 412 and an adhesive material. The non-woven fabric base material can be composed of, for example, the aforementioned electrical insulating material. The protection tape 410 may include a base material layer and an adhesive layer. The base material layer includes the electrical insulating material 411 and the carbon particles 412. The adhesive layer can be formed on a surface of the base material layer. The adhesive layer includes an adhesive material.

Second Example

Figure 4:
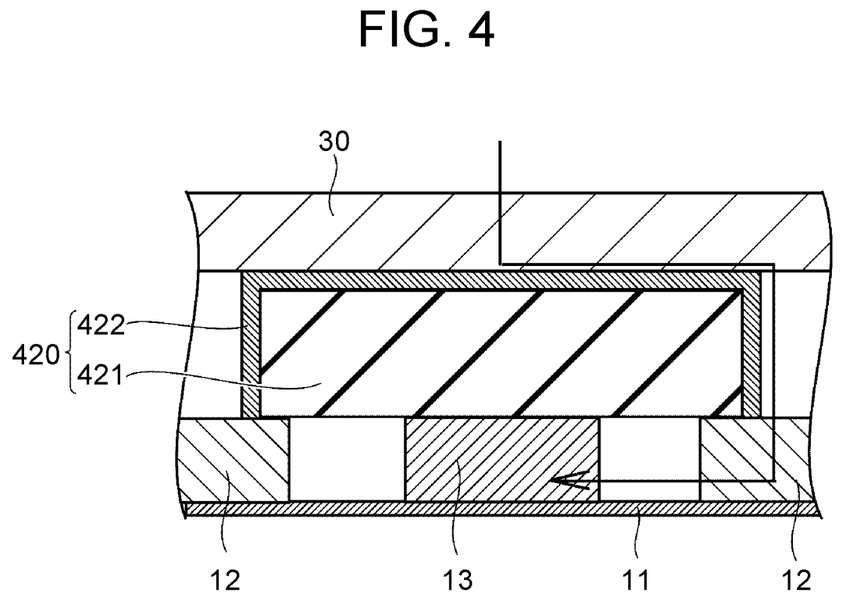
FIG. 4 is a conceptual sectional view showing another example of the protection layer.

A surface of the protection tape of the present embodiment may include a part where the volume resistivity is locally reduced FIG. 4 is a conceptual sectional view showing another example of the protection tape. A protection tape 420 (protection layer) includes an insulation layer 421 and a vapor-deposited metal layer 422. The insulation layer 421 can be composed of the electrical insulating, material 411. The insulation layer 421 may have a thickness of, for example not smaller than 1 μm larger than 1 mm. The insulation layer 421 may have a volume resistivity of, for example, approximately from $1 \times 10^{16}$ Ω·cm to $1 \times 10^{18}$ Ω·cm. Owing to the insulation layer 421, internal short-circuit due to the positive electrode tab 13 can be avoided. The vapor-deposited metal layer 422 is formed on a surface of the insulation layer 421. The vapor-deposited metal layer 422 is interposed between the insulation layer 421 and the separator 30. For example, the vapor-deposited metal layer 422 may have a volume resistivity lower than the volume resistivity of the positive electrode mixture layer 12.

The vapor-deposited metal layer 422 extends so as to come in contact with a part of the positive electrode mixture layer 12. Therefore, when the foreign object 5 is present between the vapor-deposited metal layer 422 (protection tape 420) and the negative electrode 20, a leakage current can flow from the vapor-deposited metal layer 422 to the positive electrode mixture layer 12 in a withstand voltage test. The leakage current further flows through the positive electrode current collector 11 and reaches the positive electrode tab 13. Thus, the foreign object 5 can be detected. The vapor-deposited metal layer 422 may have a thickness of, for example, from 1 nm to 1 μm. The vapor-deposited metal layer 422 may include Al, for example.

<Separator>

The separator 30 is a band-shaped sheet. The separator 30 is a porous membrane having an electrical insulation property. The separator 30 can have an insulation breakdown voltage of for example, from 2.5 kV to 4 kV. The insulation breakdown voltage of the separator 30 can be measured by a method in accordance with JISC2110-1: Solid Electrical Insulating Materials—Test Methods for Electric Strength—Part 1: Tests at Power Frequencies.

The separator 30 can be made of, for example, PE or PP. The separator 30 may have a thickness of, for example, from 10 μm to 30 μm. The separator 30 may have a multi-layer structure. The separator 30 may be composed of, for example, a porous membrane made of PP, a porous membrane made of PE, and a porous membrane made of PP that are stacked in this order.

<Positive Electrode>

The positive electrode 10 is a band-shaped sheet. The positive electrode 10 includes the positive electrode current collector 11, the positive electrode mixture layer 12, and the positive electrode tab 13. The positive electrode current collector 11 may be, for example, an Al foil. The positive electrode current collector 11 may have a thickness of, for example, from 10 μm to 30 μm. The positive electrode mixture layer 12 is disposed on a surface of the positive electrode current collector 11. The positive electrode mixture layer 12 may be disposed on each of front and back surfaces of the positive electrode current collector 11. The positive electrode mixture layer 12 may have a thickness of, for example, from 10 μm to 200 μm .

The positive electrode mixture layer 12 may contain, tor example, 80 to 98 mass % of a positive electrode active material, 1 to 10 mass % of an electrically conductive material, and 1 to 10 mass % of a binder. The positive electrode active material should not be particularly limited. The positive electrode active material may be, for example, $LiCoO_2$, $LiNiO_2$, $LiMnO_2$, $LiNi_{1/3}Co_{1/3}Mn_{1/3}O_2$. $LiMn_3O_4$, or $LiFePO_4$. One type of positive electrode active material may be used alone, or two or more types of positive electrode active material may be used in combination. The electrically conductive material may be, for example, carbon black. The binder may be, for example, polyvinylidene fluoride (PVdf).

<Negative Electrode>

The negative electrode 20 is a band-shaped sheet. The negative electrode 20 includes a negative electrode current collector 21 and a negative electrode mixture layer 22. The negative electrode 20 can include a negative electrode tab (not shown). The negative electrode tab can be, for example, a copper (Cu) strip or a nickel (Ni) strip. The negative electrode current collector 21 may be, for example, a Cu foil. The negative electrode current collector 21 may have a thickness of, for example, from 10 μm to 30 μm. The negative electrode mixture layer 22 is disposed on a surface of the negative electrode current collector 21. The negative electrode mixture layer 22 may be disposed on each of front and back surfaces of the negative electrode current collector 21. The negative electrode mixture layer 22 may have a thickness of, for example, from 10 μm to 200 μm.

The negative electrode mixture layer 22 may contain, for example, 95 to 99.5 mass % of a negative electrode active material and 0.5 to 5 mass % of a binder. The negative electrode active material should not be particularly limited. The negative electrode active material may be, for example, graphite, easily graphitizable carbon, hardly graphitizable carbon, silicon, silicon oxide, tin, or tin oxide. One type of negative electrode active material may be used alone, or two or more types of negative electrode active material may be used in combination. The binder may be, for example, carboxymethylcellulose (CMC) or styrene-butadione rubber (SBR).

<Electrolytic Solution>

The electrode group 100 is impregnated with an electrolytic solution. The electrolytic solution is a liquid electrolyte. The electrolytic solution includes a solvent and a supporting electrolyte. The solvent should not be particularly limited. For example, the solvent may be a mixed solvent of cyclic carbonate and chain carbonate. The mixing ratio of cyclic carbonate and chain carbonate may be approximately from 1:9 to 5:5 by volume, for example.

Cyclic carbonate may be, for example, ethylene carbonate (EC) or propylene carbonate (PC). Chain carbonate may be, for example, ethyl methyl carbonate (EMC), dimethyl carbonate (DMC), or diethyl carbonate (DEC). One type each of cyclic carbonate and chain carbonate may be used alone, or two or more types each of cyclic carbonate and chain carbonate may be used in combination. The supporting electrolyte may be, for example, $LiPF_6$, $LiBF_4$, or $Li[N(FSO_2)_2]$. The electrolytic solution can contain, for example, from 0.5 mol/l to 2 mol/l of the supporting electrolyte. The electrolytic solution may contain, for example, an additive such vinylene carbonate (VC), $Li[B(C_2O_4)_2]$, or $LiPO_2F_2$.

Battery Manufacturing Method>

Figure 5:
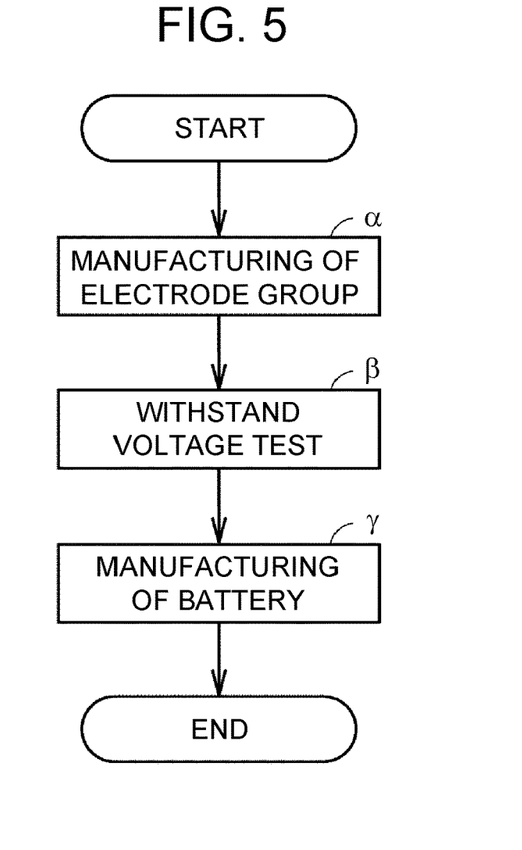
FIG. 5 is a flowchart showing an outline of a battery method according to the embodiment of the present disclosure.

FIG. 5 is a flowchart showing an outline of a battery manufacturing method according to the embodiment of the present disclosure. The manufacturing method of the present embodiment includes (α) manufacturing of an electrode group, (β) a withstand voltage test, and (γ) manufacturing of a battery. In the following, the manufacturing method of the present embodiment will he described step by step.

<(α) Manufacturing of Electrode Group>

The manufacturing method of the present embodiment includes manufacturing the electrode group 100. The electrode group 100 can be manufactured, for example, by stacking the positive electrode 10 and the negative electrode 20 with the separator 30 inserted therebetween and then rolling this stack into a spiral shape.

The positive electrode 10 cart be manufactured by a conventionally known method. For example, a positive electrode mixture paste containing a positive electrode active material is prepared. This positive electrode mixture paste is applied to a surface of the positive electrode current collector 11 and dried to form the positive electrode mixture layer 12. Then the positive electrode mixture layer 12 is rolled. The positive electrode current collector 11 and the positive electrode mixture layer 12 are together cut into bands. The positive electrode tab 13 is joined to a predetermined position of the positive electrode current collector 11. The protection tape is attached so as to cover the positive electrode tab 13. The negative electrode 20 can be manufactured by the same procedure as the positive electrode 10.

(β) Withstand Voltage Test>

The manufacturing method of the present embodiment includes conducting a withstand voltage test on the electrode group 100. In the withstand voltage test of the present embodiment, a voltage lower than the insulation breakdown voltage of the separator 30 is applied across the positive electrode 10 and the negative electrode 20, under a condition that a leakage current flows through the protection tape 400 when the foreign object 5 is present between the protection tape 400 and the negative electrode 20. The electrode group 100 is determined to be a defective product when the leakage current flows between the positive electrode 10 and the negative electrode 20, and the electrode group 100 is determined to be a non-defective product when the leakage current does not flow between the positive electrode 10 and the negative electrode 20.

A withstand voltage test machine is used for the withstand voltage test. The test voltage may be for example, approximately from 100 V to 2000 V The duration of application of the voltage may be, for example, approximately from 0.5 seconds to 5 seconds. The insulation resistance is estimated based on the magnitude of the leakage current. For example, when a leakage current corresponding to an insulation resistance of from 10 MΩ to 50 MΩ or lower is detected, it may be determined that the electrode group 100 is a defective product, i.e., a foreign object is trapped therein.

The protection tape 400 having a moderately low volume resistivity may be used to establish the condition that the leakage current flows also through the protection tape 400. Specifically, the protection tape 400 may have a volume resistivity not lower than the volume resistivity of the positive electrode mixture layer 12 nor higher than 100 times that volume resistivity.

The protection tape 420 having an electrically conductive layer on a surface may he used to establish the condition that the leakage current flows through the protection tape 420 (see FIG. 4). Specifically, the protection tape 420 may include the insulation layer 421 and the vapor-deposited metal layer 422. The insulation layer 421 includes the electrical insulating material 411. The vapor-deposited metal layer 422 is interposed between the insulation layer 421 and the separator 30. The vapor-deposited metal layer 422 is in contact with a part of the positive electrode mixture layer 12.

In the withstand voltage test, the electrode group 100 may be pressed such that the separator 30 elastically undergoes compressive deformation in a thickness direction thereof. Thus, the distance between the positive electrode 10 and the negative electrode 20 is reduced, so that the condition that the leakage current flows also through the protection tape 400 can be established.

Figure 6:
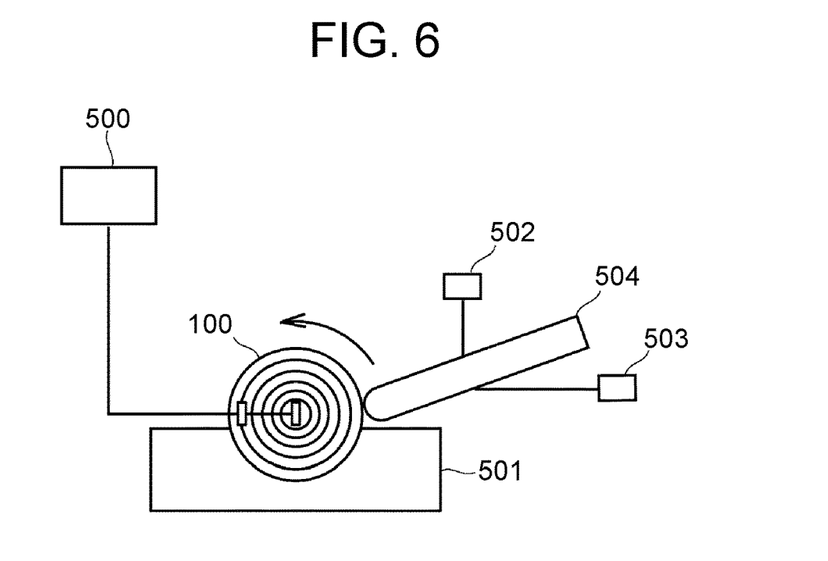
FIG. 6 in is a conceptual sectional view showing an example of a withstand voltage test.

FIG. 6 is a conceptual sectional view showing an example of the withstand voltage test. The positive electrode 10 (positive electrode tab 13) and the negative electrode 20 (negative electrode tab) are connected to a withstand voltage test machine 500.

The electrode group 100 is supported on a support unit 501. A press device 502 applies a pressing force to a pressing unit 504. The pressing force is adjusted such that the separator 30 elastically undergoes compressive deformation. If the separator 30 plastically undergoes compressive deformation, the battery performance may deteriorate. A driving unit 503 is configured so as to move the pressing unit 504 so as to follow the contour of the electrode group 100. A leading end of the pressing unit 504 may have a curved surface. The leading end having a cured surface can avoid causing a defect, such as a scratch, in the electrode group 100. For example, the leading end of the pressing unit 504 may be formed by a roller. The leading end of the pressing unit 504 can be made of, for example, a resin material. It is desirable that the resin material be moderately hard and form a smooth surface.

<(γ) Manufacturing of Battery>

The manufacturing method of the present embodiment includes manufacturing a battery including an electrode group that has been determined to be a non-defective product in the withstand voltage test. For example, the electrode group 100 is housed in the casing 50. The positive electrode tab 13 is joined to a predetermined position of the casing 50. The negative electrode tab is joined to a predetermined position of the easing 50. The electrolytic solution is poured into the casing 50. The casing 50 is sealed.

The battery 200 is thus manufactured. The battery 200 of the present embodiment has undergone the withstand voltage test that can detect the foreign object 5 trapped between the protection tape 400 and the negative electrode 20. Therefore, the battery 200 of the present embodiment can be a highly reliable battery.

The above embodiment is in every respect merely illustrative and not restrictive. The technical scope defined by the description of the scope of claims includes all possible modifications equivalent in meaning and scope to the description of the scope of claims.

What is claimed is:

1. A battery comprising an electrode group including a positive electrode, a separator, a negative electrode, and a protection layer,
the separator being interposed between the positive electrode and the negative electrode,
the positive electrode including a positive electrode current collector, a positive electrode mixture layer, and a positive electrode tab,
the positive electrode mixture layer being disposed on a surface of the positive electrode current collector,
the positive electrode tab being electrically connected to the positive electrode current collector,
the protection layer covering a surface of the positive electrode tab, a volume resistivity of the protection layer being within a range of one to 100 times of a volume resistivity of the positive electrode mixture layer, the protection layer including an electrical insulating material and metal particles.

2. The battery according to claim 1, wherein the metal particles include aluminum particles.

3. The battery according to claim 1, wherein the protection layer is interposed between the positive electrode tab and the separator.

4. A battery comprising an electrode group including a positive electrode, a separator, a negative electrode, and a protection layer, the separator being interposed between the positive electrode and the negative electrode, the positive electrode including a positive electrode current collector, a positive electrode mixture layer, and a positive electrode tab, the positive electrode mixture layer being disposed on a surface of the positive electrode current collector, the positive electrode tab being electrically connected to the positive electrode current collector, the protection layer covering a surface of the positive electrode tab, the protection layer including an insulation layer and a vapor-deposited metal layer, the insulation layer including an electrical insulating material, the vapor-deposited metal layer being interposed between the insulation layer and the separator, the vapor-deposited metal layer being in contact with at least a part of the positive electrode mixture layer.

5. The battery according to claim 1, wherein the electrical insulating material includes at least one of polyimide, glass fiber, ceramic, polyethylene, polypropylene, and polytetrafluoroethylene.

6. The battery according to claim 5, wherein the electrical insulating material is polyimide.

7. A manufacturing method of a battery, the manufacturing method comprising:

manufacturing an electrode group, the electrode group including a positive electrode, a separator, a negative electrode, and a protection layer, the separator being interposed between the positive electrode and the negative electrode, the positive electrode including a positive electrode current collector, a positive electrode mixture layer, and a positive electrode tab, the positive electrode mixture layer being disposed on a surface of the positive electrode current collector, the positive electrode tab being electrically connected to the positive electrode current collector, the protection layer covering a surface of the positive electrode tab;

conducting a withstand voltage test on the electrode group, the withstand voltage test determining the electrode group to be a defective product when a leakage current flows between the positive electrode and the negative electrode by applying a voltage, lower than an insulation breakdown voltage of the separator, across the positive electrode and the negative electrode, under a condition that the leakage current flows through the protection layer when a foreign object is present between the protection layer and the negative electrode, and the withstand voltage test determining the electrode group to be a non-defective product when the leakage current do not flow between the positive electrode and the negative electrode by applying the voltage across the positive electrode and the negative electrode, under the condition; and manufacturing a battery including the electrode group that has been determined to be the non-defective product in the withstand voltage test.

8. The manufacturing method according to claim 7, wherein a volume resistivity of the protection layer is within a range of one to 100 times a volume resistivity of the positive electrode mixture layer.

9. The manufacturing method according to claim 7, wherein:

the protection layer includes an insulation layer and a vapor-deposited metal layer;

the insulation layer includes an electrical insulating material;

the vapor-deposited metal layer is interposed between the insulation layer and the separator; and the vapor-deposited metal layer is in contact with at least a part of the positive electrode mixture layer.

10. The manufacturing method according to claim 7, wherein, in the withstand voltage test, the electrode group is pressed such that the separator elastically undergoes compressive deformation in a thickness direction of the separator.

* * * * *

UNITED STATES PATENT AND TRADEMARK OFFICE
CERTIFICATE OF CORRECTION

PATENT NO. : 10,651,446 B2  
APPLICATION NO. : 15/984784  
DATED : May 12, 2020  
INVENTOR(S) : Yukinari Tanabe et al.

Page 1 of 3

It is certified that error appears in the above-identified patent and that said Letters Patent is hereby corrected as shown below:

On the Title Page

Item (72), Inventor 1, City, delete "Nagoya" and insert --Nagoya-shi Aichi-ken--, therefor.

Item (72), Inventor 2, City, delete "Miyoshi" and insert --Miyoshi-shi Aichi-ken--, therefor.

Item (72), Inventor 3, City, delete "Okazaki" and insert --Okazaki-shi Aichi-ken--, therefor.

Item (72), Inventor 4, City, delete "Toyota" and insert --Toyota-shi Aichi-ken--, therefor.

Item (72), Inventor 5, City, delete "Miyoshi" and insert --Miyoshi-shi Aichi-ken--, therefor.

In the Specification

Column 1, Line(s) 17, after "method", insert --of--.

Column 2, Line(s) 3, after "collector", insert --.--.

Column 2, Line(s) 27, after "layer", insert --.--.

Column 2, Line(s) 46, after "positive", delete ",".

Column 2, Line(s) 52, after "covers", delete "it" and insert --a--, therefor.

Column 2, Line(s) 54, after "metal", delete "laver." and insert --layer.--, therefor.

Column 2, Line(s) 66, delete "polyimide fiber," and insert --polyimide, glass fiber,--, therefor.

Column 3, Line(s) 2, after "polyimide", delete "," and insert --.--, therefor.

Signed and Sealed this  
Thirtieth Day of June, 2020

Andrei Iancu  
*Director of the United States Patent and Trademark Office*

CERTIFICATE OF CORRECTION (continued)
U.S. Pat. No. 10,651,446 B2

Column 4, Line(s) 10 & 11, delete "battery method" and insert --battery manufacturing method--, therefor.

Column 4, Line(s) 13, after "FIG. 6", delete "in".

Column 4, Line(s) 26, after "battery", insert --,--.

Column 4, Line(s) 37, delete "easing" and insert --casing--, therefor.

Column 4, Line(s) 56 & 57, delete "composed of positive" and insert --composed of the positive--, therefor.

Column 4, Line(s) 59, after "Alternatively", insert --,--.

Column 5, Line(s) 31, after "current in", delete ",".

Column 5, Line(s) 39, delete "First Example" and insert --<First Example>--, therefor.

Column 5, Line(s) 43, after "may", delete "he" and insert --be--, therefor.

Column 5, Line(s) 51, after "mixture", delete "lave" and insert --layer--, therefor.

Column 6, Line(s) 42, after "may", delete "he" and insert --be--, therefor.

Column 7, Line(s) 6, delete "Second Example" and insert --<Second Example>--, therefor.

Column 7, Line(s) 10, after "reduced", insert --.--.

Column 7, Line(s) 14, delete "insulating, material" and insert --insulating material--, therefor.

Column 7, Line(s) 16, after "example", insert --,--.

Column 7, Line(s) 16, before "larger", insert --nor--.

Column 7, Line(s) 44, after "voltage of", insert --,--.

Column 8, Line(s) 3, delete "tor" and insert --for--, therefor.

Column 8, Line(s) 9, delete "LiNi$_{1/3}$Co$_{1/3}$Mn$_{1/3}$O$_2$ .LiMn$_3$O$_4$" and insert --LiNi$_{1/3}$Co$_{1/3}$Mn$_{1/3}$O$_2$, LiMn$_2$O$_4$--, therefor.

Column 8, Line(s) 15, delete "PVdf" and insert --PVDF--, therefor.

Column 8, Line(s) 42, delete "styrene-butadione rubber" and insert --styrene-butadiene rubber--, therefor.

CERTIFICATE OF CORRECTION (continued)
U.S. Pat. No. 10,651,446 B2

Column 8, Line(s) 64, after "such", insert --as--.

Column 8, Line(s) 65, delete "Battery Manufacturing Method>" and insert --<Battery Manufacturing Method>--, therefor.

Column 9, Line(s) 5, after "will", delete "he" and insert --be--, therefor.

Column 9, Line(s) 13, delete "cart" and insert --can--, therefor.

Column 9, Line(s) 27, delete "(β) Withstand Voltage Test>" and insert --<(β) Withstand Voltage Test>--, therefor.

Column 9, Line(s) 44, after "may be", insert --,--.

Column 9, Line(s) 45, after "2000 V", insert --.--.

Column 9, Line(s) 61, after "may", delete "he" and insert --be--, therefor.

Column 10, Line(s) 24, delete "cured" and insert --curved--, therefor.

Column 10, Line(s) 39, delete "easing" and insert --casing--, therefor.

In the Claims

Column 12, Line(s) 21, Claim 7, after "current", delete "do not" and insert --does not--, therefor.